United States Patent
Danielsson et al.

(10) Patent No.: US 9,553,686 B2
(45) Date of Patent: Jan. 24, 2017

(54) COMPRESSION METHOD FOR TDM FRAMES IN A PACKET NETWORK

(71) Applicant: NET INSIGHT INTELLECTUAL PROPERTY AB, Stockholm (SE)

(72) Inventors: Magnus Danielsson, Stocksund (SE); Lars Persson, Stockholm (SE); Christer Bohm, Nacka (SE)

(73) Assignee: NET INSIGHT INTELLECTUAL PROPERTY AB, Stockholm (SE)

( * ) Notice: Subject to any disclaimer, the term of this patent is extended or adjusted under 35 U.S.C. 154(b) by 191 days.

(21) Appl. No.: 14/366,409

(22) PCT Filed: Nov. 22, 2012

(86) PCT No.: PCT/EP2012/073398
§ 371 (c)(1),
(2) Date: Jun. 18, 2014

(87) PCT Pub. No.: WO2013/097997
PCT Pub. Date: Jul. 4, 2013

(65) Prior Publication Data
US 2015/0003470 A1 Jan. 1, 2015

(30) Foreign Application Priority Data
Dec. 30, 2011 (SE) .................................... 1151293

(51) Int. Cl.
| | | |
|---|---|---|
| H04L 12/43 | (2006.01) | |
| H04J 3/16 | (2006.01) | |
| H04L 12/64 | (2006.01) | |
| H04J 3/06 | (2006.01) | |
| H04L 12/911 | (2013.01) | |

(52) U.S. Cl.
CPC ................ *H04J 3/1694* (2013.01); *H04J 3/06* (2013.01); *H04L 12/6418* (2013.01); *H04L 47/826* (2013.01)

(58) Field of Classification Search
None
See application file for complete search history.

(56) References Cited

U.S. PATENT DOCUMENTS

| | | | |
|---|---|---|---|
| 6,633,566 B1 | 10/2003 | Pierson, Jr. | |
| 7,590,070 B1 * | 9/2009 | Asawa | ................ H04L 1/0014 370/230 |

(Continued)

OTHER PUBLICATIONS

International Search Report PCT/ISA/210 for International Application No. PCT/EP2012/073398 Dated Apr. 2, 2013.

*Primary Examiner* — Minh-Trang Nguyen
(74) *Attorney, Agent, or Firm* — Harness, Dickey & Pierce, P.L.C.

(57) ABSTRACT

Example embodiments provide a compression method for TDM frames transported over a packet network. The method is based on mapping of allocated TDM slots but not all un-allocated slots into a transport structure, which thereby reduces the needed amount of data transported over packets and hence reduces the required packet rate and packet capacity during transport of the TDM frame. The mapping is further arranged to allow dynamic changes of packet rate and packet capacity, thus the mapping is performed such that a working size of the transport TDM frame is allowed to increase or decrease over time.

20 Claims, 4 Drawing Sheets

(56) References Cited

U.S. PATENT DOCUMENTS

| 7,899,081 B2* | 3/2011 | Kwon ................... H04L 5/0007 |
| | | 370/343 |
| 2004/0190548 A1 | 9/2004 | Harel et al. |
| 2006/0165122 A1 | 7/2006 | Gupta et al. |
| 2009/0175278 A1 | 7/2009 | Harel et al. |
| 2011/0268132 A1 | 11/2011 | Kobatake |

* cited by examiner

COMPRESSION METHOD FOR TDM FRAMES IN A PACKET NETWORK

TECHNICAL FIELD

Example embodiments relate to the field of Time Division Multiplex (TDM) frame over packet communication, and more particularly to a compression method for such communication.

BACKGROUND

Traditionally Time Division Multiplex (TDM) based traffic has been transported in synchronous or plesiochronous fixed sized frames, in technologies such as Synchronous Digital Hierarchy (SDH) and Plesiocronous Digital Hierarchy (PDH). The rate and size of frames remains the same regardless of the usage.

With the introduction of packet based traffic such as provided by Ethernet and IP network services, packets are sent from a transmitting node whenever there is data. This allows for statistical multiplexing of various streams.

A TDM frame with its fixed continuous repetition rate can be mapped onto a stream of packets. Each TDM frame holds N slots of data, of which a predetermined number of slots can be mapped into packet(s), which when done continuously forms a packet stream carrying the full TDM frame sequence over a sequence of packets. Such a mapping of TDM frames into packets will produce a fixed rate of packets regardless of the usage of the TDM slots.

One approach to build packets (illustrated in FIG. 1) from a repetitive TDM frame 101 is to view the TDM slots as a continuous slot stream 102, where every N'th slot is being marked as slot 0 in a frame. Within the slot stream 102 the slot numbers can be given by dead reckoning, just as with normal TDM transmission.

This slot stream 102 is then put into packets 103 by including P number of slots from the slot stream 102 into each packet. If the packet includes a slot 0, the first slot being a slot 0 is marked, as illustrated by the arrows 104 and 105 in FIG. 1. If the frame 101 is so small that a number of frames 101 can be held within the packet, then pointing out the first slot to be slot 0 is done by utilizing that the number of slots P allowed for implications of the other frames is known.

Figure 1:
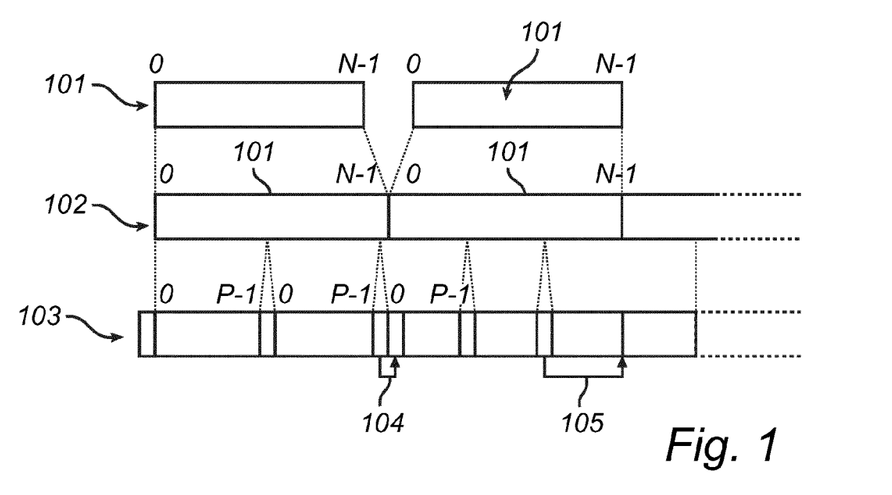
FIG. 1 is an illustration of packaging of TDM frames into a packet stream.

Use of sequence numbers on the packets, will allow for packets to be detected as missing as well as to sort them to overcome re-ordering such that the TDM frames 101 can be recovered properly at a receiving node.

Optionally Forward Error Correction (FEC) can be provided such as 1 or 2 dimensional FEC matrices, as being used in SMPTE 2022 data-streams.

When using a FEC correction a number of packets may be generated and transmitted, for instance: 9 data packets followed by a parity packet. When received in the receiving node, the packets are buffered, and if one packet is missing, as result of being dropped by the network, that packet may be re-created from the other 9 packets. This requires all the 10 packets to be buffered for restoration prior to releasing the data for further processing. This causes a delay, for a high packet rate, say 1000 packets a second, which amounts to 10 ms, where as a slower rate of 200 packets a second represents 50 ms of delay. With a varying packet rate, the delay will also vary for the same FEC configuration. More complex FEC configurations to achieve better redundancy will require more packets and hence longer delay.

The end result will be (excluding now the additional packages due to FEC) a packet stream 103 having a packet rate of $f_{packet} = f_{frame} * N/P$. This packet rate will be independent on the number of actually allocated slots out of the N slots being setup in each TDM frame.

The problem with this is that the packet rate remains the same high number regardless of amount of capacity actually being in use in the TDM frame. For a TDM frame setup for 100 Mb/s a usage of only 10 Mb/s would still produce the packet rate to support the 100 Mb/s. This behavior is inflexible and rented capacity or use of infrastructure is less cost-efficient than desired.

SUMMARY

In view of the above, example embodiments provide a method which in a more efficient manner handles TDM frames transported over a packet network. In order to decrease the packet rate and hence the used capacity for transporting TDM frames, this invention present ways to remove the unused capacity from the transported TDM frame.

Example embodiments provide a method which allows for dynamic changes of a compression scheme used for mapping TDM frames into packages, as well as allowing an increase or decrease of the amount of transported TDM slots without losing data in the allocated slots as part of the change. A packet transport of TDM traffic which has a dynamic packet rate which is a function of the actual TDM traffic need is therefore presented herein.

Example embodiments are directed to mapping allocated TDM slots into a transport TDM frame. Example embodiments are based on the insight that mapping of allocated TDM slots but not all un-allocated slots to a transport structure can save the needed amount of data transported over packets and hence reduce the required packet rate and packet capacity.

Thus, in accordance with an example embodiment, there is provided a method for node to node transfer of a TDM frame over packet transfer from a transmitting node to a receiving node. The method comprises, in the transmitting node, identifying ranges of allocated and unallocated slots in the TDM frame, determining an initial working size of the TDM frame, mapping the allocated slots and a subset of the identified ranges of unallocated slots to a transport TDM frame according to a mapping configuration. The step of mapping is performed such that a working size of the transport TDM frame is allowed to increase and decrease over time.

The proposed method identifies TDM slots not being in use in the TDM frames and provides means to remove the unused slots from the packet stream in such a way that the rebuilt TDM frame will provide transport of all the active TDM slots. The benefit is that the packet rate will be lower when the TDM slot usage is decreased which allows for other traffic to make use of this capacity, thus providing a "compression" of the traffic.

Example embodiments provide an advantage in that during periods of low amount of traffic on the TDM channels, the free capacity is available for use on the packet network. This can be useful for allowing more best effort traffic during periods when high quality of service demanding media transfers is not occurring. It can also provide the ability to achieve more dynamic Service Level Agreement, SLA, contracts with a better price for the customer and better network resource utilization for the provider.

According to an example embodiment, the mapping or a change in mapping configuration is performed without data loss. To avoid that allocation and de-allocation of channels have impact on the quality of channels, in the method, a mechanism is provided to alter the mappings on the fly, such data loss can be avoided.

According to an example embodiment, it further comprises identifying a first unallocated slot range of unallocated slots at the tail of the TDM frame. The increase of the working size is provided by adding slots after the identified first unallocated slot, and the decrease of the target working size is provided by not mapping slot numbers starting at the determined first unallocated slot. The benefit from this is that the mapping is straight and the compression information is in a form of a single number which is cheap to transport, coordinate and implement.

According to an example embodiment, it further comprises performing a pre-negotiation between the transmitting node and the receiving node to initiate a change in the working size of the transport TDM frame.

Pre-negotiations significantly reduce the amount of processing needed to be done at switch-time between a current and a new working size of the transport TDM frame, thus reducing the cost of implementation. Further, it also allows for asynchronous hand-shaking in the design, which is a common way of resolving various temporal locking mechanisms, also contributing to a simplified design. A pre-negotiation protocol can allow for additional synchronization time in source and destination nodes, thus relaxing implementation.

According to an example embodiment, the mapping further comprises shifting or copying predetermined allocated slots within the TDM frame to slot numbers corresponding to a subset of the identified ranges of unallocated slots which are identified within the initial working size.

The ability to move the un-allocated space allows further ability to compress all unused slots with the compression at the tail of the TDM frame, regardless of which location a free channel had. Thus, for tail compression the re-arrangements allows for optimizing the compression for all cases.

According to an example embodiment, shifting or copying of predetermined allocated slots within the TDM frame is synchronized by messages passed between the transmitting node and the receiving node.

This simple protocol allows for a relaxed timing, allowing a simplified implementation of the shifting/copying mechanism of the method.

According to an example embodiment, the step of mapping further comprises providing a mapping configuration defining slots to be transferred, and a subset of the defined ranges of unallocated slots not to be transferred in a mapping configuration. The benefit of this method is that inclusion and exclusion of slot ranges can be done with very small amounts of signaling. In particular will removal of slots not require re-arrangement of slots within the frame in order to achieve an efficient compression.

According to an example embodiment, the mapping configuration is exchanged between the transmitting node and the receiving node in the form of a bitmap table encoding the transfer/non transfer of the TDM frame per TDM slot, which is advantageous in that the per slot processing can be amended with a simple bit vector (or equivalent representation) indication wither the slow is/was transported or not.

According to an example embodiment, the mapping configuration is exchanged between the transmitting node and the receiving node in the form of changes of the transfer/non transfer of the TDM frame per TDM slot.

The benefit from this is that the full bit map does not have to be transferred on each mapping configuration change, but a smaller message can be sent with higher efficiency and lower signaling latency as result.

According to an example embodiment, it further comprises providing the receiving node with a synchronizing signal to initiate a coordinated change of mapping configuration used for the packet stream from the transmitting node to the receiving node, such that correct interpretation of the packet stream can be achieved continuously. The benefit from this is that the active channels will not be affected, with data-loss as result, as other channels are added or removed.

According to an example embodiment, in the mapping configuration a first unused TDM slot of a defined range of unallocated slots is encoded to indicate the number of continuous unallocated slots within that defined range which are not transferred in the transferred TDM frame. The benefit of this is that no pre-negotiations need to occur since the transfer/no-transfer information is encoded into the stream.

According to an example embodiment, it further comprises at the receiving node: de-mapping based on the mapping configuration the allocated slots and the subset of the identified ranges of unallocated slots from the transport TDM frame to recreate the allocation TDM frame. The benefit of this is that the compression has little (in case of moving slots for tail compression) or no impact on channel allocations, which can progress independently. Thus, separation between sub-systems and minimize interlocking of processes causing system delays is achieved.

According to an example embodiment, it further comprises combining independent channels to form the transport TDM frame as an aggregate transport TDM frame, thereby enabling a reduced packet buffer delay. This advantageously provides a mechanism by which several combined independent streams provide sufficient capacity to produce a high packet rate, resulting in lower packet buffer delay. This is of particular importance when considering FEC mechanisms where a number of packets need to be buffered, and a common packet stream at high rate produce lower delay than what the streams would experience individually for the same FEC configuration.

According to an example embodiment, it further comprises for a low packet rate transport signal: decreasing the transport TDM slot working size in order to maintain a current packet rate, thereby ensuring a predetermined packet delay limit. The packet delay limit is ensured for a low rate signal by decreasing the transport TDM working size in order to maintain a set packet rate. The benefit of this is to provide a mechanism by which low rate signals can maintain a limited receiver buffer delay. Another benefit is that the end-to-end delay including the packet compression can provide an essentially static delay regardless of the dynamics of aggregate capacity and TDM compression.

Example embodiments are implemented in a node to node communication by means of a software module for signaling and data transport in form of software, FPGA, ASIC or other suitable method, adapted to perform the method of the present invention (not shown). The software module and/or data-transport module may be integrated in the node comprising suitable processing means and memory means, or may be implemented in an external device comprising suitable processing means and memory means, and which is arranged for interconnection with an existing node.

Further objective of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the invention, wherein other parts may be omitted or merely suggested.

DETAILED DESCRIPTION OF EXAMPLE EMBODIMENTS

The TDM compression method according to example embodiments uses allocation information of a TDM frame to provide an altered, simulated TDM frame when mapping the TDM frame into the transport TDM frame. This mapping is governed by a mapping configuration, which may be changed in time to adapt for different traffic conditions. Changes in this mapping need to be done dynamically in order to support dynamic changes in transported channels. The mapping or a change in mapping configuration is preferably performed without data loss.

According to example embodiments, it comprises steps for:
identifying un-allocated slots in a TDM frame,
removing at least some of the un-allocated slots at the source node,
(optionally) transferring and recreating the TDM frame at a destination node), and
allowing seam-less re-configuration of both mapping and packet transport mechanisms as the number of allocated slots increase and decrease.

Figure 8:
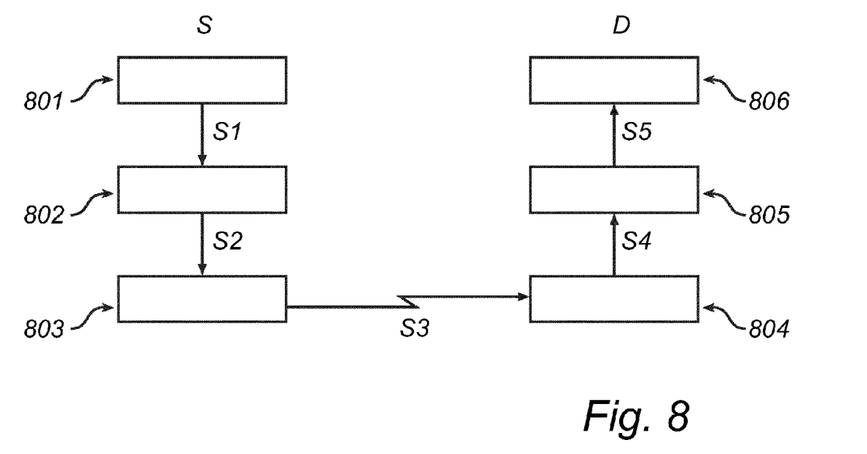
FIG. 8 is an illustration of the overall method data flow and processing steps according to an example embodiment.

A preferred example embodiment is illustrated in the system of FIG. 8, which illustrates steps performed at a source node S and steps performed at a destination node D at which the current inventive method is implemented. The source node S is arranged to use a modified packetization method from that of FIG. 1. The TDM frame 101 of FIG. 1 is here represented by an allocation TDM frame 801. By using the allocation information of the allocation TDM frame 801, identified allocated sub-set of slots is in a first step S1 mapped into a transport TDM frame 802.

This transport TDM frame 802 is subsequently, after in a step S2 wherein packet mapping is employed (as illustrated in FIG. 1), transported in a step S3 over packets, as a packet stream 803 which at a destination node D is received as a packet stream 804. During the packet transport packets may be lost, duplicated, re-arranged and delayed beyond recovery. Details of packet recovery is beyond the scope of this text, but it is assumed that the packet order for 804 can be re-established to be that of the transmission order of 803 such that the transport TDM frame 805 as recovered after a step S4 of packet de-mapping (thus reversing the process of S2), can be rebuilt as a delayed version of the transport TDM frame 802.

By using knowledge of the compression mapping performed in step S1 which is preferably done according to a predetermined mapping configuration as is described herein under with reference to FIGS. 3-7, the transport TDM frame 805 can then recreate an allocation TDM frame 806, step S5 de-mapping, at the destination node D as a complete replica of the allocation TDM frame 801 in the source node S. The compression benefit becomes that the un-allocated space is not allowed to take up space in the transported packet stream 803, while the rebuilt allocation TDM frame can be used as before transmission from the source.

Figure 2:
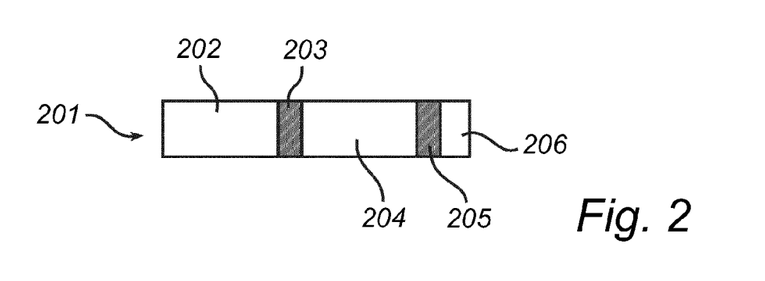
FIG. 2 is an illustration of a fractionally allocated TDM frame.

Now, consider a TDM frame 201 as presented in FIG. 2. Such a TDM frame is what is being used for channel allocations and is best described as the allocation TDM frame 201. Example embodiments provide methods for mapping this allocation TDM frame 201 into a transport TDM frame, which only holds the active parts of the allocation TDM frame in order to thereby achieve the compression of the unused parts.

Consider a fractionally allocated TDM frame 201 in FIG. 2. The TDM frame 201 consists of N slots. The slot ranges 202, 204 and 206 hold slots in which are allocated by channels, whereas slot ranges 203 and 205 are not allocated by any channels and thus do not carry any user traffic.

Figure 3:
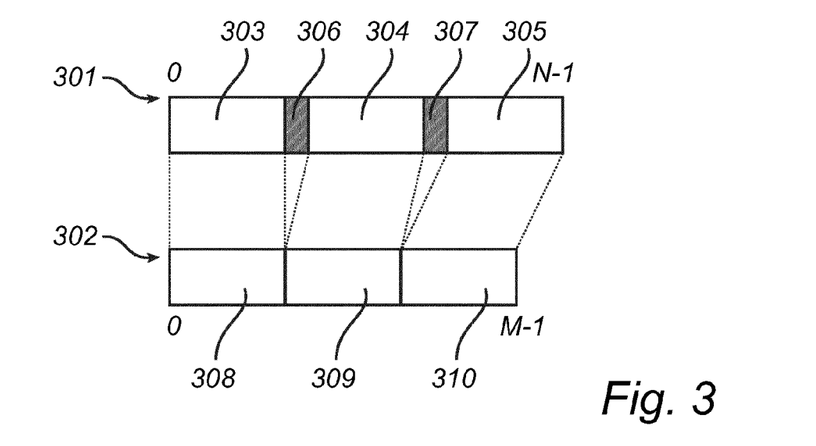
FIG. 3 is an illustration of mapping from allocation TDM frame into transport TDM frame according to an example embodiment.

In FIG. 3 an allocation TDM frame 301 is mapped into a transport TDM frame 302 such that allocated ranges 303, 304 and 305 are mapped into transported ranges 308, 309 and 310 of the transport TDM frame 302. This mapping avoids the transport of the unallocated ranges 306 and 307 without loss of user traffic. This illustrates the advantage of the TDM mapping compression method.

Figure 4A:
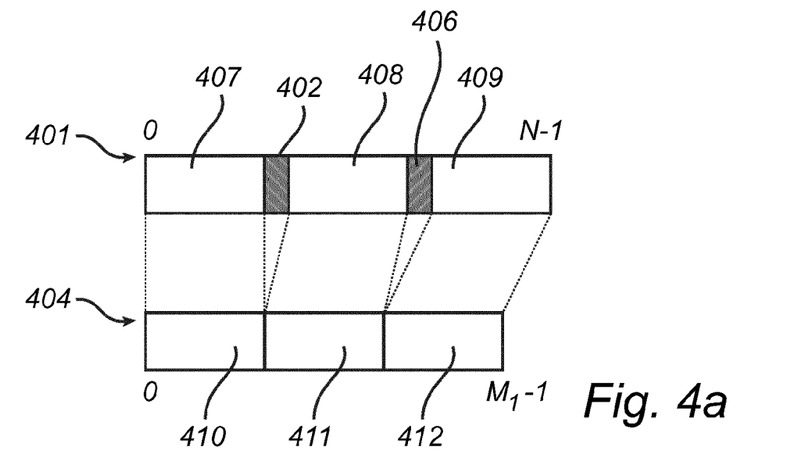
FIG. 4 is an illustration of change in allocation to transport TDM frame mapping configuration according to an example embodiment.

The change of capacity using the present TDM mapping compression method is illustrated in FIG. 4a). A start allocation TDM frame 401 contains allocated ranges 407, 408 and 409, which are mapped into frame 404 as ranges 410, 411 and 412, and unused ranges 402 and 406 which are not currently mapped into an initial transport TDM frame 404. The transport TDM frame 404 thus holds $M_1$ slots as being the sum of slots needed to hold the ranges 407, 408 and 409. Since the 402 range needs to be included into the final allocation TDM frame 403 (of FIG. 4b)) and to be mapped into a final transport TDM frame 405 the mapping is altered to include the unused range 402 as the allocated range 413 which is mapped into the TDM frame 405 as range 414 prior to allowing the slot range to be allocated for user traffic. The transport TDM frame 405 thus holds $M_2$ slots as being the sum of slots needed to hold the ranges 407, 413, 408 and 409.

Figure 4B:
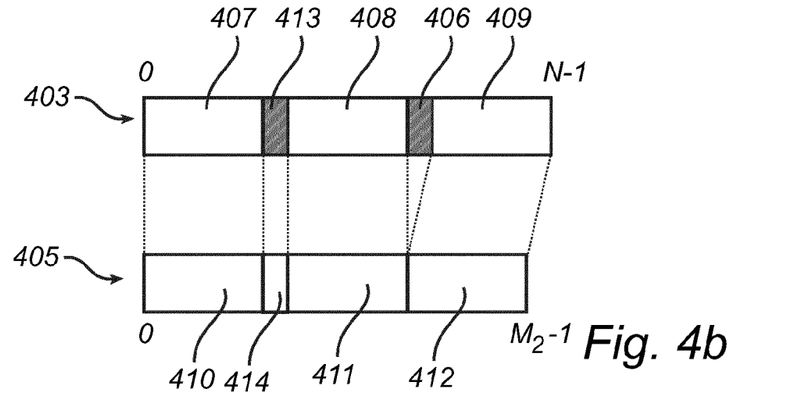

In a similar fashion freeing of capacity is accomplished by removing range 414 from the transport TDM frame 405 into the form of the transport TDM frame 404. Thus, the TDM mapping compression can increase and decrease the effective capacity, i.e. working size $M_1$ and $M_2$ of the transport TDM frame, by selecting which slots are being transported and which are being skipped. The state of transported/skipped slots can be viewed as a bit-vector indexed by the allocation slot number. This bit-vector is either transported explicitly or only changes of it is being transferred as suitable.

An alternative mapping will encode the empty areas by using a run-length encoding format for the empty regions, thus forming a TDM stream compression method. This would not need pre-negotiations, as discussed further below, as it could be done directly in the encoding.

Figure 5:
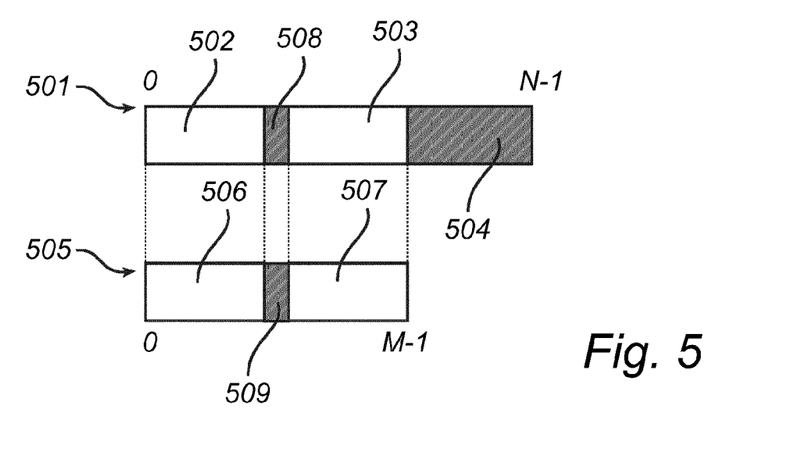
FIG. 5 is an illustration of tail compression according to an example embodiment.

A third variant of compression according to an example embodiment, would be a tail compression as being illustrated in FIG. 5. It uses a straight slot-slot mapping from an allocation TDM frame 501 into a transport TDM frame 505 and is thus retaining the slot numbers such that channels 502 and 503 are mapped into 506 and 507 respectively without change of slot numbers. The unused slot-range 504 at the end of the allocation TDM frame 501 is omitted after the last allocated slot in channel 503. This leaves the unused allocation 508 which is mapped to the unused transport TDM frame range 509. For compression, only the numbers of slots transported M need to be transferred for agreement between source and destination on the mapping.

Referring now to FIG. 6, for a tail-compression allocation TDM frame 610 initially ranges of segments 601, 602 and 603 were allocated with channels and a tail range 604 was unallocated and not included in the transport TDM frame. When the channel occupying the segment 602 is closed the range becomes unallocated. However, since tail-compression is used this segment cannot be directly compressed in the transport TDM frame due to its location before the allocated segment 603. In order to remedy this we would like to shift the segment 603 to be in a position ahead of the segment 602, which would require us to move the segment 602 and its slots being in use with user traffic, see FIG. 6a).

In order to achieve this without data-loss the channel(s) of segment 603 is moved within the allocation TDM frame using a duplicate mechanism. The segment 603 is divided into two sub-segments 606 and 607 where the segment 606 fits into the size of the segment 602, as illustrated in an intermediate version of the allocation TDM frame 611 in FIG. 6b). The data in the slots of the segment 606 are duplicated (verbatim copies within the same TDM frame) into the segment 605 which will now be the new location for transmission of the sub-segment 606 data. When the source node (see FIG. 8) has set up the duplication of the sub-segment 606 into segment 605 it signals this to the destination node, which will re-map its reading of the segment 606 to occur from the segment 605 slots. When the destination node has implemented the change, it signals back to the source node, which now can de-allocate the segment 606 which now becomes the free segment 608 of the allocation TDM frame 612, see FIG. 6c).

Figure 6A:
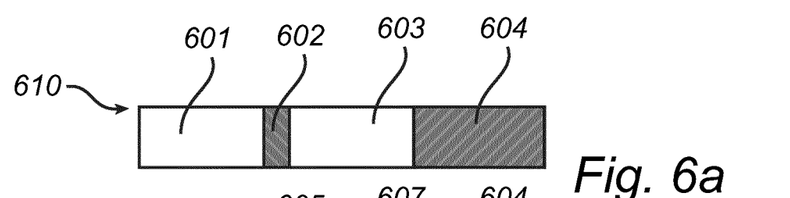
FIG. 6 is an illustration of tail compression slot range move algorithm according to an example embodiment.
Figure 6B:
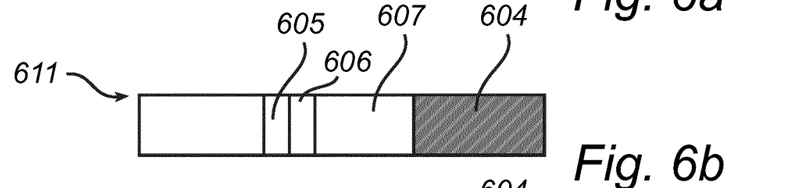
Figure 6C:
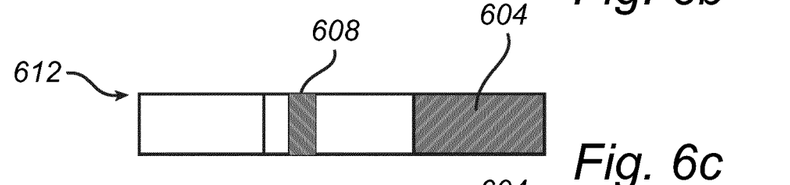
Figure 6D:
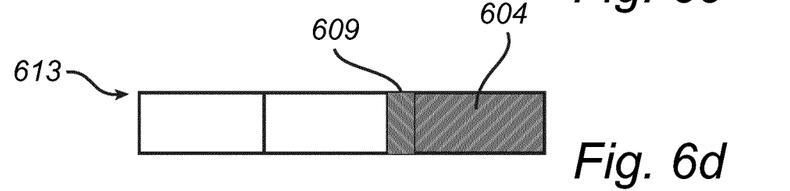

This process is performed recursively until the unallocated slot-range has been moved to the unallocated region 609 located at the end of the transport allocation TDM frame 613 and hence the end of the transport TDM frame and now can be compressed using the tail compression method and join the region 604 as being compressed out from the transport TDM frame, see FIG. 6d).

It should be noted that the slot-move algorithm avoids loss of data on active channels by use of relaxed timing relationships as the source and destination nodes are synchronized using simple messages.

The slot move algorithm can be implemented by these steps:
1) The source node creates duplicate segment 605, as identified above.
2) The source node informs the destination, by means of a message, that segment (slot region) 606 will move to segment (slot region) 605.
3) The destination node maps the usage of segment 606 to use the new segment 605, as instructed by the message.
4) The destination node acknowledges the move by sending a message to the source node.
5) The source node can now safely remove the data from segment 606.

The source node can perform step 1 without timing requirements from the destination node, as it has yet to learn about the change. With step 2, the destination node learns about the change, and can in step 3 shifts its usage without timing requirements from the source node. When done, it can inform the source node with step 4 and it can then perform step 5 without timing requirements from the destination node. Thus, the two messages of step 2 and 4 achieve all the needed synchronization between the nodes, while the processes of step 1, 3 and 5 can operate in the time needed, thus having a relaxed timing requirement.

Figure 7A:
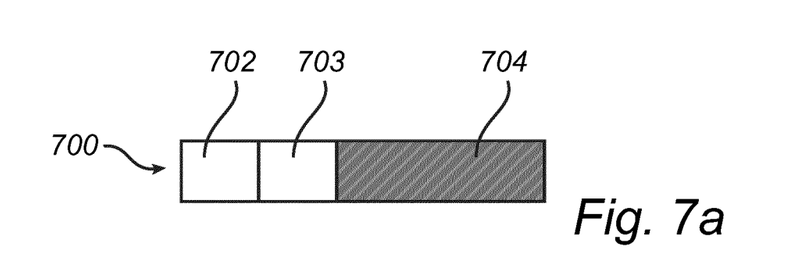
FIG. 7 is an illustration of tail compression new allocation according to an example embodiment.
Figure 7B:
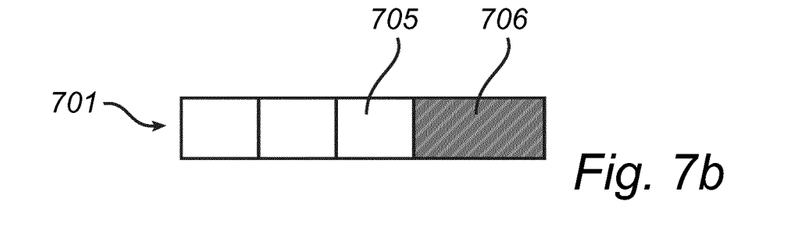

For a tail-compressed link, see FIG. 7a), with an allocation TDM frame 700 with existing channels 702 and 703 followed with the unallocated range 704, a new channel is allocated at the beginning of the unallocated range 704 such that segment 705 is the new channel and 706 is the remaining unallocated range of allocation TDM frame 701, see FIG. 7b).

To fit in the new segment 705 the tail of a corresponding transport TDM frame is extended such that the full 705 range becomes transmitted. This extension is made prior to allow any user traffic to be allocated into the 705 range to ensure that no data-loss occurs.

It is further of importance that change of TDM transport mapping can be achieved without affecting the continuous traffic in the channels. According to embodiments of the method, this is achieved by performing pre-change negotiations between the source node and the destination node concerning an up-coming mapping configuration change, followed by coordination of the swap of active mapping configuration.

For both the TDM mapping compression and the tail-compression method, as previously described, the compression change, i.e. the change in mapping configuration, can be pre-negotiated, and when both the source and destination nodes agrees that a compression change has been achieved, the shift between a previous compression configuration, i.e. mapping configuration, to the new compression configuration can then be signaled from the source using a commit flag or configuration set flag in the packet stream headers.

An exemplifying embodiment of the packet transport of TDM frames is now described in reference to FIG. 1. Considering that for one embodiment of the present method there are Dynamic synchronous Transfer Mode (DTM) slots in the DTM TDM frames 101, and 65 bits of data are required for each slot. Transport is provided in Ethernet/IP packets of 1500 bytes MTU, using an IP header (20 bytes), UDP wrapper (8 bytes), and a dedicated header of 12 bytes providing a total of 40 bytes. This leaves space for transport of 179 slots from the 102 slot stream to form the packet stream 103.

The maximum number of slots per packet may be configured, but a default value of 179 provides best utilization. The number of slots in the TDM frame 101 is also configurable to match the needs of a current application/traffic situation. A multitude of these can be configured on the same Ethernet port. The characteristics of the link are negotiated between the source and destination node using a separate protocol.

An exemplifying embodiment of the synchronization change of the mapping configuration uses a bit in the header, which has a default value of 0. Using the characteristic negotiation protocol, the changes of the transport/skip bitmask is transferred. When a complete set of changes has been sent to the receiving/destination node, the source node will request the change of configuration to the receiving node, which will reply with an acknowledge when it is ready to execute the swap. When the source receives the acknowledge message, it executes the swap on the first packet-header suitable by setting the swap-bit to 1. The swap-bit will be sent on all packets until swap is complete. The source will also send an update done request message to the destination.

The receiver will use the new configuration on the stream from the first packet with the swap-bit set to 1. The receiver will also send an update done acknowledge message back to the source, to indicate that the swap was executed. On the reception of the swap acknowledge the source clears the swap bit such that the swap-bit is 0 again on all packets and thus the system is prepared for a new round of changes.

The person skilled in the art realizes that the present invention by no means is limited to the embodiments described above. On the contrary, many modifications and variations are possible within the scope of the appended claims. For example, embodiments of the invention may be based on other network technologies such as AES/EBU, MADI, HR-MAI, HD-SDI and POTS where multiple audio and/or video streams forms a TDM structure and which usage may dynamically change.

The invention claimed is:

1. A method for node-to-node transfer of a plurality of Time Division Multiplex (TDM) frames over packet transfer from a transmitting node to a receiving node, said method comprising:
   in said transmitting node for each TDM frame:
      identifying ranges of allocated and unallocated slots in said TDM frame;
      determining an initial working size of said TDM frame;
      mapping said allocated slots and a subset of said identified ranges of unallocated slots to a transport TDM frame according to a mapping configuration; and
      performing synchronized dynamic mapping configuration change, thereby allowing a dynamic effective capacity of the working size of the transport TDM frame over time.

2. A method according to claim 1, wherein said mapping or a change in mapping configuration is performed without data loss.

3. A method according to claim 2, wherein said mapping further comprises providing a mapping configuration defining slots to be transferred; and
   a subset of said defined ranges of unallocated slots not to be transferred in a mapping configuration.

4. A method according to claim 2, wherein in said mapping configuration, a first unused TDM slot of a defined range of unallocated slots is encoded to indicate the number of continuous unallocated slots within that defined range which are not transferred in the transferred TDM frame.

5. A method according to claim 2, further comprising:
   for a low packet rate transport signal,
      decreasing the transport TDM slot working size in order to maintain a current packet rate, thereby ensuring a predetermined packet delay limit.

6. A non-transitory computer readable storage medium storing computer readable instructions that are executable by a computer processor to cause the computer processor to perform the method according to claim 2.

7. A method according to claim 1, further comprising identifying a first unallocated slot of a range of unallocated slots at the tail of said TDM frame, and wherein said increase of the working size is provided by adding slots after said identified first unallocated slot, and said decrease of the target working size is provided by not mapping slot numbers starting at said determined first unallocated slot.

8. A method according to claim 7, further comprising:
   performing a pre-negotiation between said transmitting node and said receiving node to initiate a change in the working size of the transport TDM frame.

9. A method according to claim 1, wherein said mapping further comprises:
   shifting or copying allocated slots within said TDM frame to slot numbers corresponding to a subset of said identified ranges of unallocated slots which are identified within said initial working size.

10. A method according to claim 9, wherein the shifting or copying of allocated slots within said TDM frame is synchronized by messages passed between said transmitting node and said receiving node.

11. A method according to claim 1, wherein said mapping further comprises providing a mapping configuration defining slots to be transferred; and
   a subset of said defined ranges of unallocated slots not to be transferred in a mapping configuration.

12. A method according to claim 11, further comprising:
   performing a pre-negotiation between said transmitting node and said receiving node to initiate a mapping configuration change.

13. A method according to claim 11, wherein said mapping configuration is exchanged between said transmitting node and said receiving node in the form of a bitmap table encoding the transfer/non transfer of said TDM frame per TDM slot.

14. A method according to claim 11, wherein said mapping configuration is exchanged between said transmitting node and said receiving node in the form of changes of the transfer/non transfer of said TDM frame per TDM slot.

15. A method according to claim 1, further comprising providing said receiving node with a synchronizing signal to initiate a coordinated mapping configuration change.

16. A method according to claim 1, wherein in said mapping configuration, a first unused TDM slot of a defined range of unallocated slots is encoded to indicate the number of continuous unallocated slots within that defined range which are not transferred in the transferred TDM frame.

17. A method according to claim 1, further comprising:
   at said receiving node,
      de-mapping based on said mapping configuration, said allocated slots and said subset of said identified ranges of unallocated slots from said transport TDM frame to recreate said TDM frame.

18. A method according to claim 1, further comprising:
   combining independent channels to form said transport TDM frame as an aggregate transport TDM frame, thereby enabling a reduced packet buffer delay.

19. A method according to claim 1, further comprising:
   for a low packet rate transport signal, decreasing the transport TDM slot working size in order to maintain a current packet rate, thereby ensuring a predetermined packet delay limit.

20. A non-transitory computer readable storage medium storing computer readable instructions that are executable by a computer processor to cause the computer processor to perform the method according to claim 1.

\* \* \* \* \*